United States Patent
Nishimoto et al.

(10) Patent No.: US 7,356,144 B2
(45) Date of Patent: Apr. 8, 2008

(54) CONTROL OF USAGE OF CONTENTS IN DIGITAL BROADCASTS

(75) Inventors: Yusei Nishimoto, Tokyo (JP); Tatsuya Kurioka, Tokyo (JP); Toshihiro Uehara, Tokyo (JP); Seiichi Namba, Tokyo (JP); Haruo Okuda, Tokyo (JP)

(73) Assignee: Nippon Hoso Kyokai, Tokyo (JP)

(*) Notice: Subject to any disclaimer, the term of this patent is extended or adjusted under 35 U.S.C. 154(b) by 1112 days.

(21) Appl. No.: 10/398,702

(22) PCT Filed: Nov. 12, 2002

(86) PCT No.: PCT/JP02/11797

§ 371 (c)(1), (2), (4) Date: Apr. 9, 2003

(87) PCT Pub. No.: WO03/043263

PCT Pub. Date: May 22, 2003

(65) Prior Publication Data

US 2004/0093494 A1 May 13, 2004

(30) Foreign Application Priority Data

Nov. 15, 2001 (JP) ............................ 2001-349539

(51) Int. Cl.
*H04L 9/00* (2006.01)
*H04L 9/12* (2006.01)

(52) U.S. Cl. .................. 380/210; 380/200; 380/239; 380/230; 380/231; 705/52

(58) Field of Classification Search .................. None
See application file for complete search history.

(56) References Cited

U.S. PATENT DOCUMENTS

| | | | |
|---|---|---|---|
| 5,627,657 A | 5/1997 | Park | |
| 6,714,649 B1* | 3/2004 | Masuda et al. | 380/44 |
| 7,073,073 B1* | 7/2006 | Nonaka et al. | 713/193 |
| 7,099,479 B1* | 8/2006 | Ishibashi et al. | 380/281 |
| 7,110,542 B1* | 9/2006 | Tripathy | 380/201 |
| 7,269,445 B2* | 9/2007 | Natsuno et al. | 455/558 |
| 2004/0052379 A1* | 3/2004 | Nishimoto et al. | 380/281 |

FOREIGN PATENT DOCUMENTS

EP 1 118 931 7/2001

(Continued)

OTHER PUBLICATIONS

English Translation of JP 2001-128130 A Matsuura Satoshi, et al. "Method and Device for Data Generation and Transmisstion . . . " (Matsushita Denki Sangyo KK).

(Continued)

*Primary Examiner*—Syed A. Zia
(74) *Attorney, Agent, or Firm*—Ladas and Parry LLP

(57) ABSTRACT

A method of transmitting a content to a reception side includes the steps of encrypting the content by use of a scramble key that varies with time, encrypting scramble-key-associated information that includes at least the scramble key and usage-control information, the usage-control information indicative of usage of the content on the reception side, and transmitting the encrypted content and the encrypted scramble-key-associated information to the reception side.

25 Claims, 8 Drawing Sheets

FOREIGN PATENT DOCUMENTS

| | | |
|---|---|---|
| JP | 99241 | 1/1997 |
| JP | 2000196479 | 7/2000 |
| JP | 2000295202 | 10/2000 |
| JP | 20011128130 | 5/2001 |

OTHER PUBLICATIONS

English Translation of JP 2000-295202 Sakurai Atsunori "Limited Reception System" (Matsushita Denki Sangyo KK).

English Translation of JP 09009241 A "Scramble Broadcasting System, Scrambling Method, Scrambling Device and Descrambling Device" Yamashita Masami, et al. (Sony KK).

English Translation of JP 2000-196479 A "Digital Broadcasting System, Control Method for Digital Stream and Terminal Equiptment" Shimizu Takao, et al. (KK Tokyo Hoso).

Menezes, A., et al. "Handbook of Applied Cryptography." CRC Press LLC. USA (1997) pp. 551-553.

\* cited by examiner

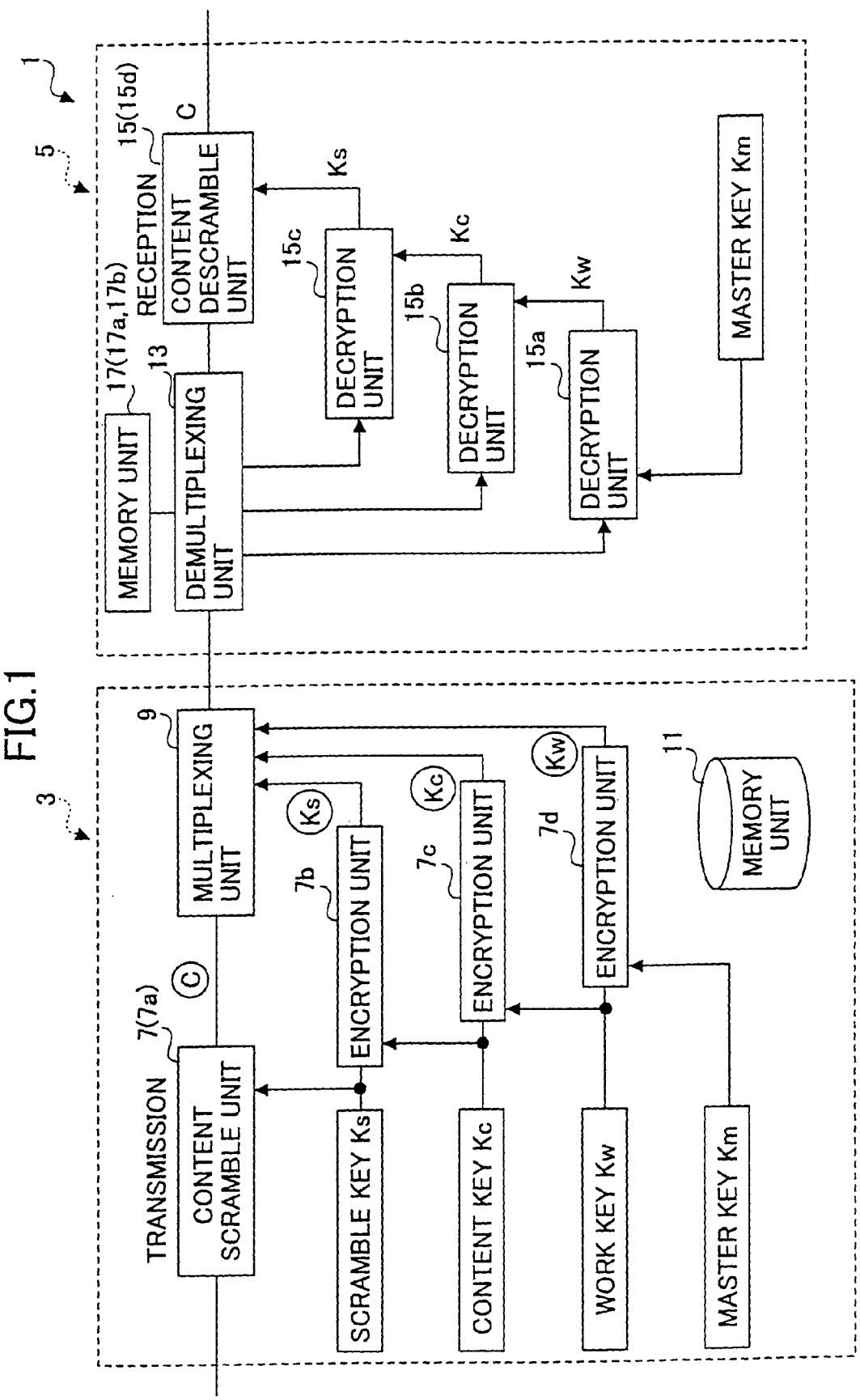

FIG.2A

SCRAMBLE-KEY-ASSOCIATED INFORMATION S

PROVIDER ID
CONTENT ID
SCRAMBLE KEY Ks
PLAY-SEQUENCE NUMBER

FIG.2B

CONTENT-KEY-ASSOCIATED INFORMATION C

PROVIDER ID
WORK KEY ID
CONTENT ID
CONTENT KEY Kc
EXPIRATION DATE
DESIGNATION OF STORAGE LOCATION
WATCHING/LISTENING -CONTROL FLAG

FIG.2C

WORK-KEY-ASSOCIATED INFORMATION W

PROVIDER ID
CARD ID
UPDATE NUMBER
EXPIRATION DATE
WORK KEY ID
WORK KEY Kw

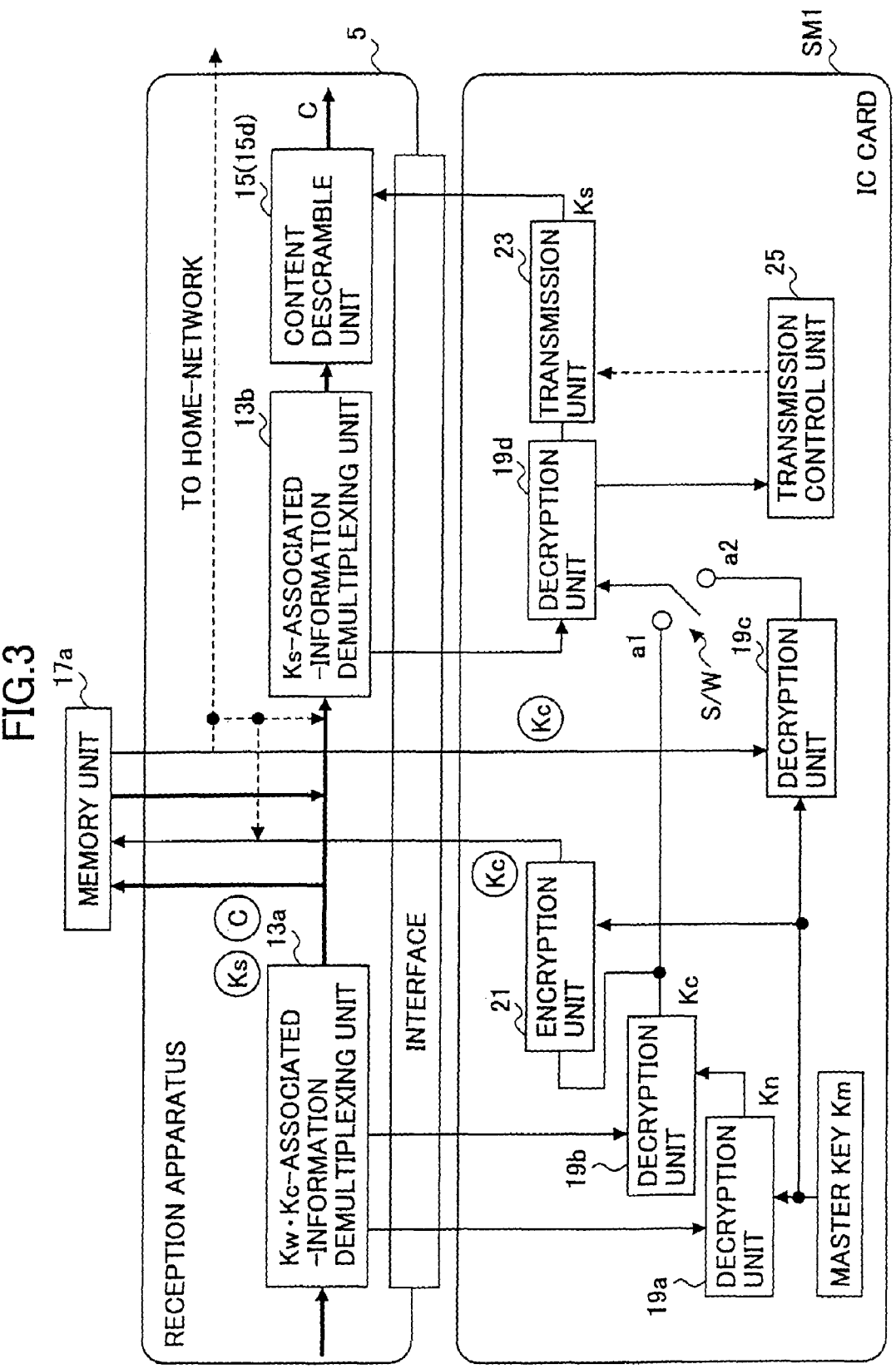

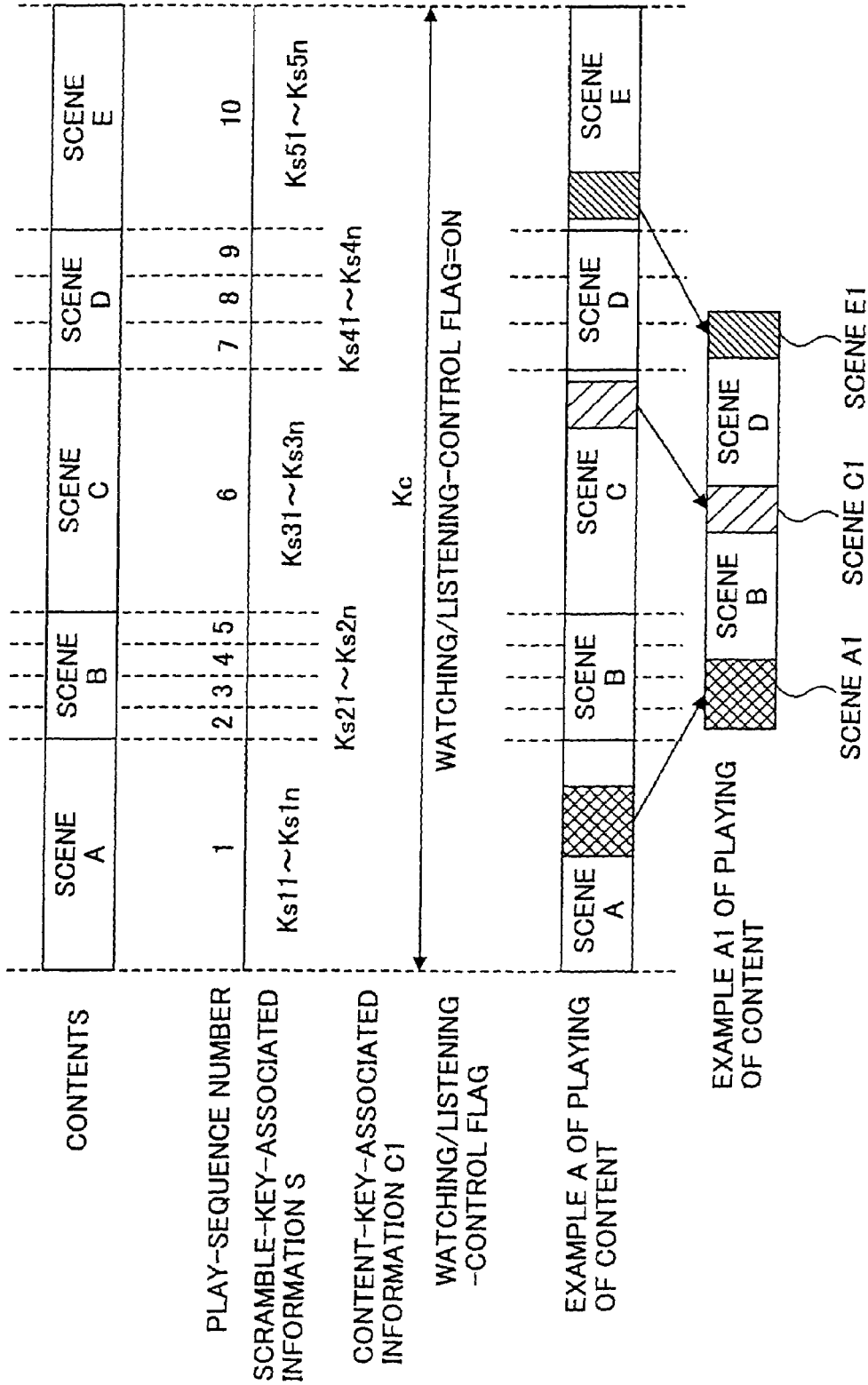

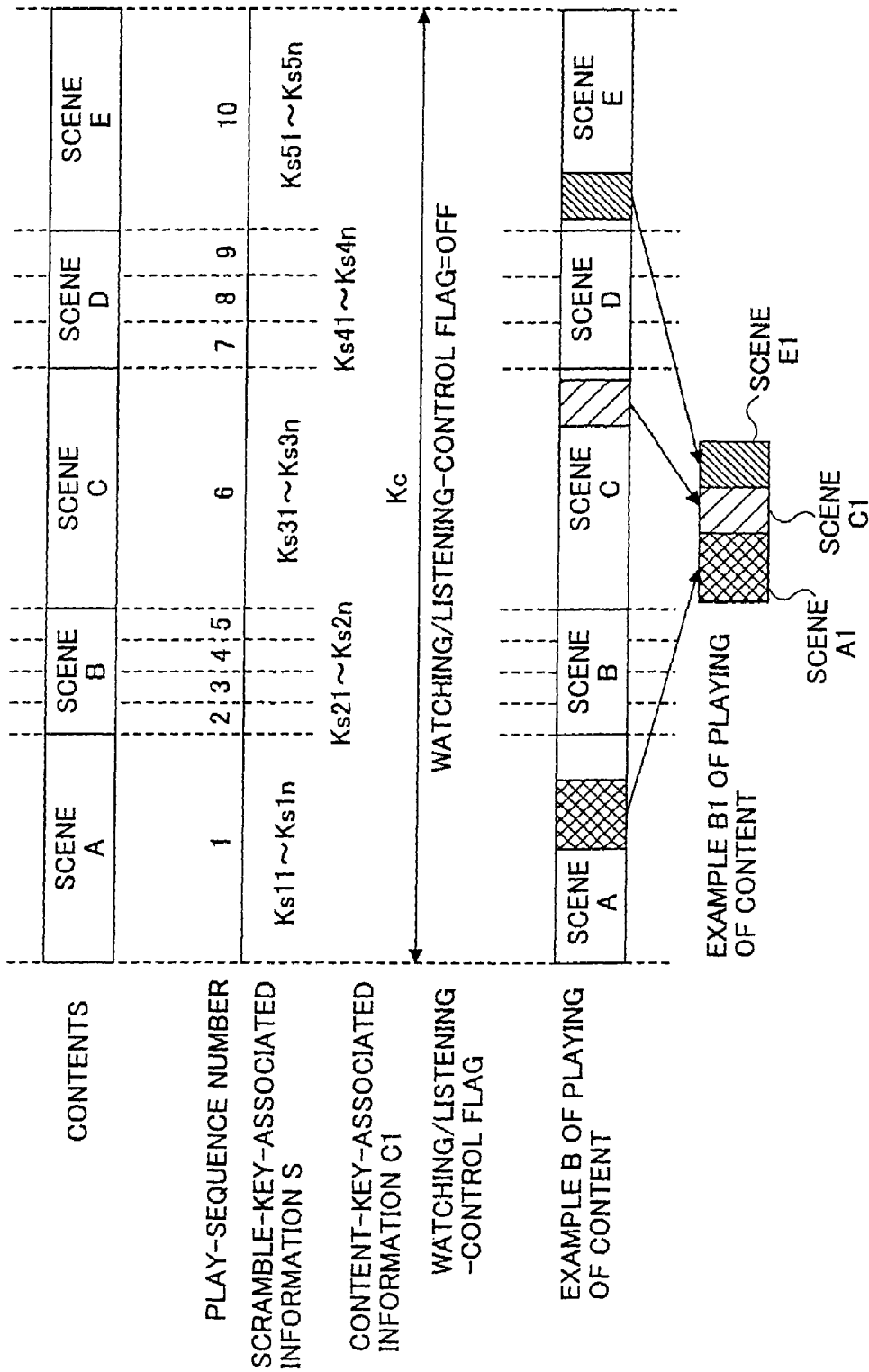

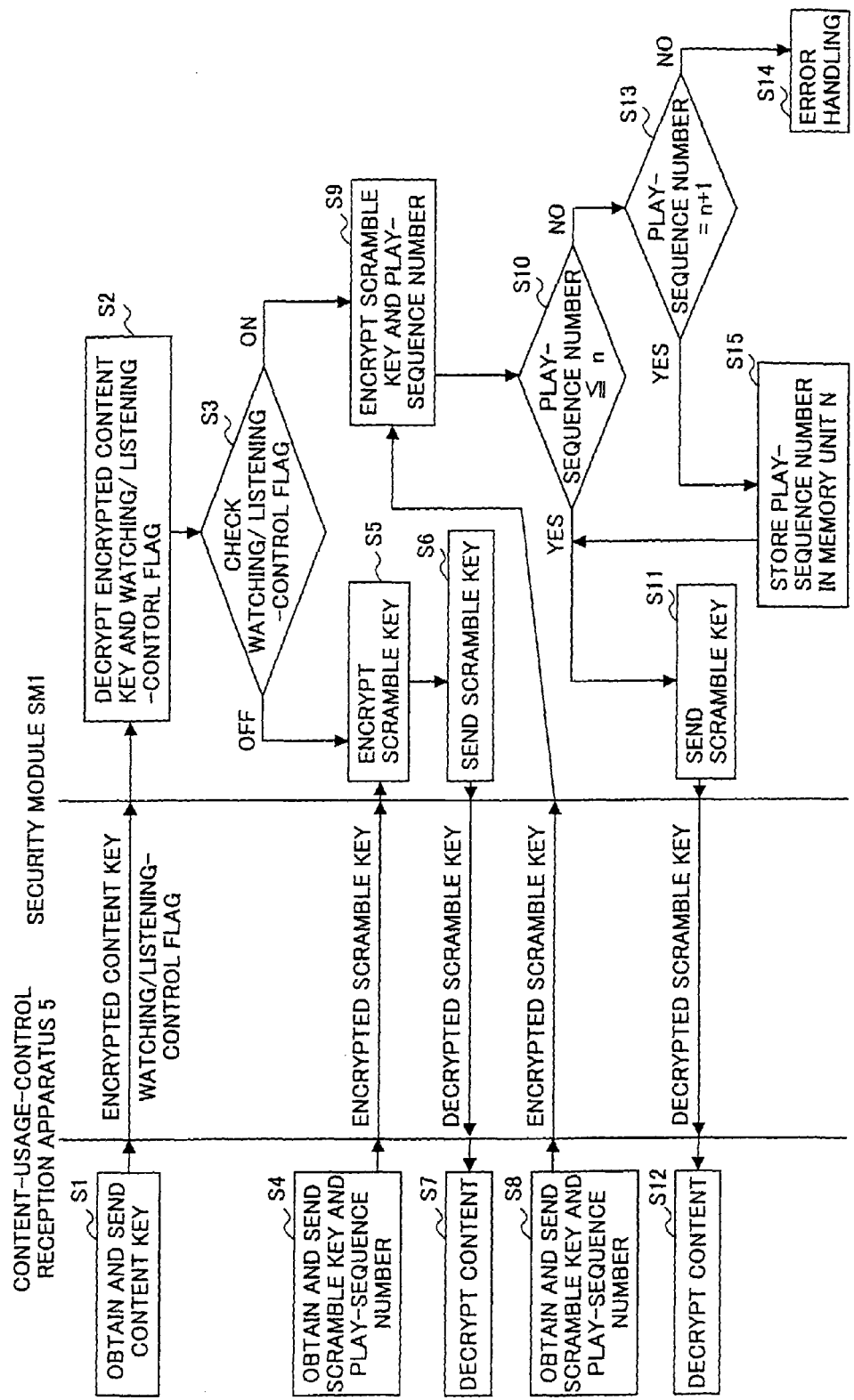

CONTROL OF USAGE OF CONTENTS IN DIGITAL BROADCASTS

TECHNICAL FIELD

The present invention generally relates to the control of information, and particularly relates to the control of use of contents in digital broadcasts.

BACKGROUND ART

In recent years, proposals have been made with regard to services (for watching or listing to contents) that allow digital contents of digital broadcasts to be stored for subsequent use (playing, editing, and so on) at a receiver end, by use of a large-volume storage device such as a hard-drive that allows random access. Such services will be realized by storing contents in a randomly accessible storage device, thereby allowing a scene of a particular content (i.e., a scene of a user-requested content) to be played on a random-access basis.

Contents of digital broadcasts include metadata corresponding to each scene. The metadata refers to information about contents, and is typically comprised of intra-program indexes equivalent to the headings of scenes in a given program. Contents having metadata attached thereto are transmitted from the transmission side, and the metadata is then utilized on the reception side for content search (i.e., search for particular scenes in the contents).

While the services that are realized based on the contents stored in randomly accessible storage devices offer great convenience to viewers/listeners (hereinafter referred to simply as viewers) at the receiving end, broadcasting stations (i.e., content providers) on the transmission side may have to tolerate the use of contents in the manner that have never been intended (i.e., the illegal use of contents). For example, part of the contents such as commercials may be skipped (erased) on purpose for the convenience of viewers. In other examples, metadata attached to the contents on the transmission side may be tampered by viewers with malicious intent on the receiver side, or may be changed to another metadata for the purpose of using contents (i.e., unauthorized use of the contents).

In order to prevent such illegal use of contents, control signals that prohibit the skipping of scenes and/or commercials in contents may be transmitted from the transmission side by multiplexing such control signals with the contents. On the reception side, the receiver is controlled to operate according to the received control signals so as to let the viewers to watch the contents.

Such measure to prevent the illegal use of contents is based upon the control of the receiver device according to the control signals multiplexed on the transmission side. The receiver, however, may be rigged, or may be a product manufactured specifically for the purpose of illegal use. In such a case, the control signals multiplexed on the transmission side may not function as originally intended.

Accordingly, there is a need for a transmission/reception scheme that can prevent the illegal use of contents even when the receiver is rigged, or is a product specifically made for illegal use.

DISCLOSURE OF INVENTION

It is a general object of the present invention to provide a transmission/reception scheme that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a transmission/reception scheme particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method of transmitting a content to a reception side. The method includes the steps of encrypting the content by use of a scramble key that varies with time, encrypting scramble-key-associated information that includes at least the scramble key and usage-control information, the usage-control information indicative of usage of the content on the reception side, and transmitting the encrypted content and the encrypted scramble-key-associated information to the reception side.

Further, the invention provides a method of decrypting an encrypted content received from a transmission side. The method includes the steps of receiving the encrypted content and encrypted scramble-key-associated information from the transmission side, said encrypted content being encrypted by use of a scramble key that varies with time, decrypting the encrypted scramble-key-associated information to obtain scramble-key-associated information that includes the scramble key and usage-control information, and decrypting the encrypted content by use of the scramble key if said usage-control information permits the decryption of the encrypted content.

Moreover, an apparatus for transmitting a content to a reception side and an apparatus for decrypting an encrypted content received from a transmission side are also provided in accordance with the invention. These apparatuses correspond to the methods described above.

According to the invention as described above, the scramble-key-associated information includes both the scramble key and the usage-control information. Even if an apparatus or devices on the reception side are rigged, or are manufactured for the purposes of illegal use, ignoring the scramble-key-associated information to invalidate the usage-control information will result in a failure to obtain the scramble key. Further, since the scramble-key-associated information is encrypted, it may be impossible to remove only the usage-control information from the scramble-key-associated information. This prevents the illegal use of contents.

Further, according to another aspect of the invention, an apparatus for decrypting an encrypted content received from a transmission side includes a receiving unit which receives the encrypted content and encrypted scramble-key-associated information from the transmission side, said encrypted content being encrypted by use of a scramble key that varies with time, said encrypted scramble-key-associated information including the scramble key and usage-control information that are encrypted, a content descramble unit which decrypts the encrypted content by use of the scramble key if said usage-control information permits the decryption of the encrypted content, and an interface unit which is configured to be connected to a decryption unit, which decrypts the encrypted scramble-key-associated information to obtain the scramble key and usage-control information.

The apparatus as described above is provided as being separate from the decryption unit which decrypts the encrypted scramble-key-associated information. Rigging of this apparatus or making of this apparatus for the purposes of illegal use does not succeed in circumventing the usage-control information. This is because the scramble-key-associated information including both the scramble key and the usage-control information is decrypted in the tamper-resistant module rather than in this apparatus.

Moreover, according to another aspect of the invention, an apparatus for decrypting a scramble key, which is configured to be connected to a content receiver for receiving an encrypted content from a transmission side and for decrypting the encrypted content by use of the scramble key, said apparatus includes a decryption unit which receives encrypted scramble-key-associated information from the content receiver, and decrypts the encrypted scramble-key-associated information to obtain scramble-key-associated information that includes the scramble key and usage-control information, and a transmission unit which transmits the scramble key to the content receiver only if said usage-control information permits the decryption of the encrypted content.

The apparatus as described above is provided as being separate from the content receiver which decrypts the encrypted content. Rigging of the content receiver or making of the content receiver for the purposes of illegal use does not succeed in circumventing the usage-control information. This is because the scramble-key-associated information including both the scramble key and the usage-control information is decrypted in the apparatus as described above rather than in the content receiver.

Other objects and further features of the present invention will be apparent from the following detailed description when read in conjunction with the accompanying drawings.

BRIEF DESCRIPTION OF DRAWINGS

FIG. 1 is a block diagram showing a system for controlling the use of contents;

FIGS. 2A through 2C are illustrative drawings showing an example of a file format when a file is transmitted from a content-usage-control transmission apparatus;

FIG. 3 is a block diagram showing a content-usage-control reception apparatus and a security module;

FIG. 4 is an illustrative drawing showing a scramble key, a content key, and a stream that is input into the content-usage-control reception apparatus;

FIG. 5 is an illustrative drawing showing an example in which a content can be played irrespective of the play-sequence numbers;

FIG. 6 is a sequence chart showing an operation that is performed when contents stored in the memory of the content-usage-control reception apparatus are subjected to watching/listening control;

MODES FOR CARRYING OUT THE INVENTION

Figure 7:
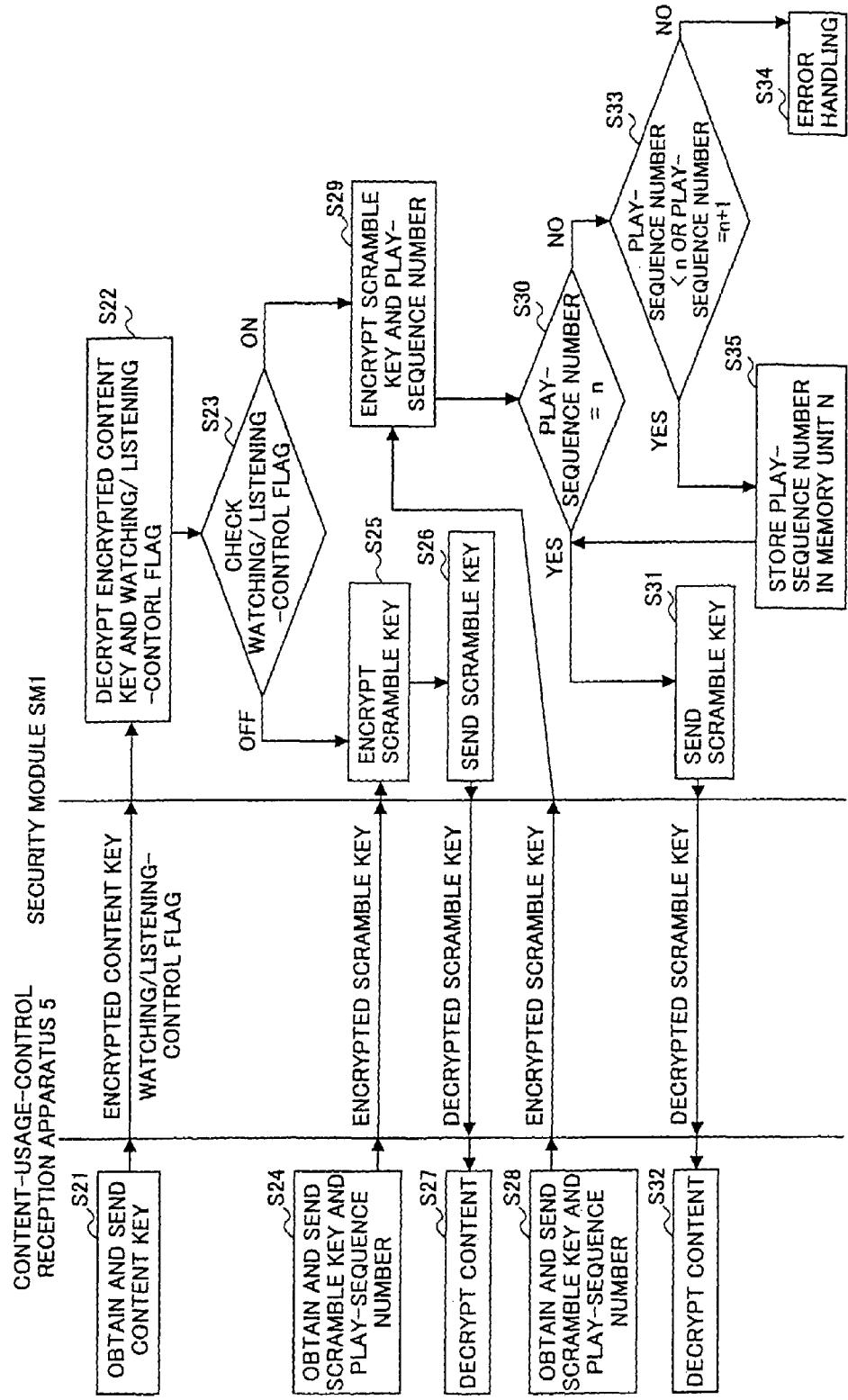
FIG. 7 is a sequence chart showing an operation that is performed when contents stored in the memory of the content-usage-control reception apparatus are subjected to watching/listening control.

In the following, embodiments of the present invention will be described with reference to the accompanying drawings.

System for Controlling Use of Contents

Transmission Apparatus and Reception Apparatus

FIG. 1 is a block diagram showing a system for controlling the use of contents. As shown in FIG. 1, a content-usage-control system 1 includes a content-usage-control transmission apparatus 3 and a content-usage-control reception apparatus 5.

The content-use-control system 1 encrypts contents of digital broadcasts, and transmits the encrypted contents together with usage-control information that controls (restricts) the use (playing, editing, etc.) of the encrypted contents on the reception side. With this provision, the system controls the use of contents at the receiver end.

Construction of Content-Usage-Control Transmission Apparatus

In what follows, the content-usage-control transmission apparatus 3 will be described.

The content-usage-control transmission apparatus 3 includes a content scramble unit 7, a multiplexing unit 9, and a memory unit 11. The content scramble unit 7 is regarded as including encryption units 7a through 7d.

The content-usage-control transmission apparatus 3 encrypts contents comprised of video and audio data, and transmits the encrypted contents to the content-usage-control reception apparatus 5 on the receiver side. In this encryption process, master keys shared with the receiver side are used (i.e., symmetric cryptography).

The content scramble unit 7 (encryption unit 7a) uses a scramble key Ks generated by a scramble key generation unit (not shown) to encrypt contents to be transmitted, thereby generating encrypted contents. By use of a content key Kc stored in the memory unit 11, the content scramble unit 7 (encryption unit 7b) encrypts associated information that includes at least the scramble key Ks and a play-sequence number (part of the usage-control information), thereby generating encrypted associated information. Here, the encrypted scramble key Ks is packetized by use of the section format of the MPEG-2 systems (ISO/IEC13818-1). As an example of this packetizing, the Entitlement Control Message format described in the ARIB (Association of Radio Industries and Businesses) standard "STD-B25" may be used. Alternately, any method similar to this standard may be used for packetizing and transmission.

The content scramble unit 7 (encryption unit 7c) uses a work key Kw stored in the memory unit 11, and encrypts content-key-associated information that includes at least the content key Kc and a watching/listening-control flag (part of the usage-control information), thereby generating encrypted content-key-associated information. By using a master key Km stored in the memory unit 11, the content scramble unit 7 (encryption unit 7d) encrypts work-key-associated information that includes at least the work key Kw, thereby generating encrypted work-key-associated information.

When contents are watched at the content-usage-control reception apparatus 5 in real-time, the transmission of the content key Kc is started a predetermined time prior to the transmission of contents, and is repeated at predetermined intervals during the transmission of contents. After the transmission of contents comes to an end, the transmission of the content key Kc is terminated. When contents that are watched are played from the stored contents following the storing of the contents in memory at the content-usagecontrol reception apparatus 5, the scrambled contents (encrypted contents) are stored in memory, and the relevant content key Kc is transmitted when authorizing the watching of the contents (authorization is controlled by the transmission side).

As described above, the encryption unit 7a serves as an content encryption unit, the encryption unit 7b as an associated information encryption unit, the encryption unit 7c as a content-key-associated information encryption unit, and the encryption unit 7d as a work-key-associated information encryption unit.

The multiplexing unit 9 multiplexes the encrypted contents, the encrypted associated information, the encrypted content-key-associated information, and the encrypted work-key-associated information together into a transport stream, thereby generating multiplexed encrypted contents, which are then transmitted to the reception side. That is, the multiplexing unit 9 serves as a transmission unit as well as a multiplexing unit.

The memory unit 11 stores therein the content key Kc, the work key Kw, and the master key Km. These keys are stored by use of a content-key-Kc database, a work-key-Kw database, and a master-key-Km database.

An additional description of the keys and the usage-control information will be appreciated if it is given here. The scramble key Ks is an encryption key that is changed with time (e.g., once in few seconds). The content key Kc is set on a content-specific basis. The work key Kw is kept longer than the play time of contents. The master key Km is also provided in the content-usage-control reception apparatus 5 (in a security module to be exact, as will be described), and is shared between the transmission side and the reception side. The master key Km is unique to each content-usage-control reception apparatus 5. The master key Km is stored in security modules in advance, and is distributed to the reception side as part of the content-usage-control reception apparatus 5.

The watching/listening control flag (watching/listening control information) is used to control the watching/listening of contents through the on/off state thereof. When the flag is on, the watching/listening of contents is controlled according to the play-sequence number after the contents are decrypted on the reception side. When the flag is off, the watching/listening of contents is immediately authorized by decrypting the encrypted scramble key. The play-sequence number (play-sequence control information) is used to control the order in which the contents are watched/listened, the detail of which will be described later.

Construction of Content-Usage-Control Reception Apparatus

In what follows, the content-usage-control reception apparatus 5 will be described.

The content-usage-control reception apparatus 5 includes a demultiplexing unit 13, a content descramble unit 15, and a memory unit 17. The content descramble unit 15 is regarded as including decryption units 15a through 15d.

The content-usage-control reception apparatus 5 receives the multiplexed encrypted contents from the content-usage-control transmission apparatus 3, and decrypts the multiplexed encrypted contents according to the usage-control information (such as a watching/listening control flag and a play-sequence number) contained in these contents. This makes the contents viewable by viewers.

The demultiplexing unit 13 receives the multiplexed encrypted contents from the content-usage-control transmission apparatus 3, and separates the received contents into the encrypted contents, the encrypted associated information, the encrypted content-key-associated information, and the encrypted work-key-associated information.

The content descramble unit 15 includes the four decryption units 15a through 15d, which decrypt the encrypted work-key-associated information, the encrypted content-key-associated information, the encrypted associated information, and the encrypted contents, respectively, once they are obtained by the demultiplexing unit 13. At the start, the decryption unit 15a decrypts the encrypted work-key-associated information by use of the master key to produce a work key.

The decryption unit 15b then decrypts the content-key-associated information by use of the work key to produce a content key and a watching/listening control flag. According to the on/off state of the watching/listening control flag, the decryption unit 15c decrypts the encrypted associated information by use of the content key, thereby generating only a scramble key or both the scramble key and a play-sequence number.

In accordance with the play-sequence number, the decryption unit 15d (content descramble unit 15) decrypts the encrypted contents by use of the scramble key, thereby producing the contents.

The memory unit 17 includes a memory unit 17a provided as a fixed component of the content-usage-control reception apparatus 5, and further includes a record-device driver unit 17b that reads/writes information from/to a removable record medium.

The content-usage-control reception apparatus 5 includes a security module SM1 (not shown in FIG. 1, but will be described later in detail). The security module SM1 includes the decryption units 15a through 15c and the master key Km, and is constituted of an IC card or the like that is not accessible from the exterior. The security module SM1 includes a memory unit N, which serves as a counter to store a numerical value corresponding to the play-sequence number (part of the usage-control information). The numerical value stored in the memory unit N is initially set to "1". Initialization of the numerical value to "1" is performed each time the content ID and the content key Kc are changed in the content-key-associated information.

Sharing of Work Key Kw

In what follows, a description will be given with regard to a case in which the work key Kw needs to be shared between a plurality of content-usage-control reception apparatuses 5. The content-usage-control transmission apparatus 3 on the transmission side reads a master key Km corresponding to a given content-usage-control reception apparatus 5 from the master-key-Km database provided in the memory unit 11. The content-usage-control transmission apparatus 3 then uses the encryption unit 7d based on the symmetric cryptography to encrypt a work key Kw by use of the master key Km. Associated information inclusive of the encrypted work key Kw is packatized in the session format of the MPEG-2 systems (ISO/IEC13818-1), for example, and is multiplexed with the encrypted contents by the multiplexing unit 9 so as to generate a transport stream.

As an example of this packetizing, the EMM (Entitlement Management Message) format described in the ARIB standard "STD-B25" may be used. The content-usage-control reception apparatus 5 on the reception side uses the demultiplexing unit 13 to obtain EMM from the received MPEG-2 transport stream, and uses the decryption unit 15a to produce a work key Kw by use of the master key Km.

The operation described above is repeated with respect to each content-usage-control reception apparatus 5, which makes it possible to share the work keys Kw between the transmission side and the reception side. The obtained work keys Kw are stored in the security modules SM. The work keys Kw shared between the content-usage-control reception apparatuses 5 may be updated once in a month or a year, for example, so as to insure the security of the work keys Kw. These work keys Kw are transmitted separately from contents by utilizing an available bandwidth of the broadcasting bandwidths.

Example of File Format

In what follows, FIGS. 2A through 2C are referred to, and a description will be given with regard to an example of a file format when a file is transmitted from the content-usage-control transmission apparatus 3. The file format of a file transmitted from the content-usage-control transmission apparatus 3 includes scramble-key-associated information S (shared information S), content-key-associated information C (shared information C), and work-key-associated information W (individual information W).

The scramble-key-associated information S (shared information S) is program information used in the transmission of a scramble key, and includes a provider ID, a content ID, a scramble key Ks, a play-sequence number, etc. The provider ID is an identification assigned to each broadcast provider. The content ID is a unique identification assigned to each content based on predetermined rules such as a rule regarding whether to allocate the same ID to an original program and a rerun program. The scramble key Ks is encrypted by using the content key Kc corresponding to the content ID. The play-sequence number defines an order in which the contents are played on the reception side.

The content-key-associated information C (shared information C) is used to transmit the content key, and include a provider ID, a work key ID, a content ID, a content key Kc, an expiration date, a designation of a storage location, a watching/listening control flag, etc. The provider ID is an identification assigned to each broadcast provider. The word key ID identifies a work key. The content ID is a unique identification assigned to each content. At least the content key Kc is encrypted by use of a work key corresponding to the work key ID.

The expiration date indicates the date until which the content key Kc is valid. The designation of a storage location is provided in advance at the transmission side, and specifies the location in which the received content key is stored in the content-usage-control reception apparatus 5. The watching/listening control flag controls the watching/listening of a content according to the on/off state thereof. When the flag is on, the watching/listening of a content is controlled according to the play-sequence number after the encrypted scramble is decrypted on the reception side.

The work-key-associated information W (individual information W) is individual information that is used to transmit a work key Kw, and includes a provider ID, a card ID, an update number, an expiration date, a work key ID, a work key, etc. The provider ID is an identification assigned to each broadcast provider or each group of broadcast providers. The card ID is an identification assigned to each security module SM. The update number is a number that indicates a version number of the work key Kw. The expiration date indicates the date until which the work key Kw is valid. The work key Kw is encrypted by use of a master key Km corresponding to the card ID.

Relationship between Reception Apparatus and Security Module

In what follows, a description will be given of the relationship between the content-usage-control reception apparatus 5 and the security module SM1 with reference to FIG. 3.

The content-usage-control reception apparatus 5 includes a Kw·Kc-associated-information demultiplexing unit 13a, a memory unit 17a, a Ks-associated-information demultiplexing unit 13b, the content descramble unit 15, and an interface. The Kw·Kc-associated-information demultiplexing unit 13a separates the associated information from the received stream (i.e., multiplexed encrypted contents) where the associated information includes the work key Kw and the content key Kc. The memory unit 17a stores therein the encrypted contents. The Ks-associated-information demultiplexing unit 13b separates the associated information inclusive of the scramble key Ks. The content descramble unit 15 descrambles the contents. The interface provides communication between the content-usage-control reception apparatus 5 and the security module SM1.

The security module SM1 is provided with the master key Km, and includes 4 decryption units (19a through 19d), an encryption unit 21, a transmission unit 23 for transmitting the scramble key Ks, a transmission control unit 25 for controlling the transmission unit 23, and a software switch S/W for controlling incoming information depending on the prescribed condition. The number of incoming data for the software switch S/W is two, and the switch is provided with two nodes a1 and a2 that correspond in number to the number of incoming data. The node a1 is selected when the contents are to be watched/listened in real-time, and the node a2 is selected when the contents are to be played for watching/listening from the stored contents.

The Kw·Kc-associated-information demultiplexing unit 13a extracts encrypted work-key-associated information from the multiplexed encrypted contents. If the card ID included in the encrypted work-key-associated information corresponds to the card ID of the security module SM1 (which is an IC card in this example), the encrypted work-key-associated information including the work key Kw, the work key ID, the update number, the expiration date, and the provider ID is input into the security module SM1. The security module SM1 uses the decryption unit 19a to decrypt the encrypted work key Kw by use of the master key Km, producing the work key Kw. The work key Kw is kept in the security module SM1 as an item corresponding to the provider ID, the update number, the expiration date, and the work key ID.

The Kw·Kc-associated-information demultiplexing unit 13a further extracts encrypted content-key-associated information. The encrypted content-key-associated information including the work key ID, the encrypted content key Kc, the provider ID, the expiration date, and the content ID is input into the security module SM1. The security module SM1 uses the decryption unit 19b to decrypt the encrypted content-key-associated information by use of the work key Kw corresponding to the work key ID, producing the content key Kc.

Example of Playing of Encrypted Contents
(Real-Time)

In the following, a description will be given of a case in which the received contents are watched/listened in real-time by use of the content-usage-control reception apparatus 5 and the security module SM1 shown in FIG. 3. Since this is the case of real-time watching/listening of contents, the software switch S/W of the security module SM1 is preset to select the node a1.

An output of the Kw·Kc-associated-information demultiplexing unit 13a is supplied to the Ks-associated-information demultiplexing unit 13b. The Ks-associated-information demultiplexing unit 13b extracts the associated information S, and supplies the associated information S inclusive of the content ID and the encrypted scramble key Ks to the security module SM1. The security module SM1 uses the decryption unit 19d to decrypt the associated information 5 by use of the content key Kc corresponding to the content ID, thereby producing the scramble key Ks and the play-sequence number. The play-sequence number is then supplied to the transmission control unit 25. In response, the transmission control unit 25 controls the transmission unit 23 according to the play-sequence number, thereby sending the scramble key Ks obtained by the decryption unit 19d to the content-usage-control reception apparatus 5. Having received the scramble key Ks, the content descramble unit 15 of the content-usage-control reception apparatus 5 uses the scramble key Ks to decrypt the encrypted contents, thereby outputting the decrypted contents.

Example of Playing of Encrypted Contents (Stored Contents)

In the following, a description will be given of a case in which contents stored in the memory unit 17a are watched/listened by utilizing the content-usage-control reception apparatus 5 and the security module SM1. Since this is the case of watching/listening of the memory-stored contents, the software switch S/W of the security module SM1 is preset to select the node a2.

The encrypted contents as they are (without decryption), are stored in the memory unit 17a together with the encrypted associated information S (shared information S) including the encrypted scramble key in such a manner to correspond to the content ID. The Kw·Kc-associated-information demultiplexing unit 13a extracts the encrypted content-key-associated information (shared information C), and supplies the encrypted content-key-associated information inclusive of the encrypted content key to the security module SM1. In the security module SM1, the decryption unit 19b decrypts the content key, and, then, the encryption unit 21 encrypts the decrypted content key. The newly encrypted content key Kc is supplied to the content-usage-control reception apparatus 5, where it is stored in the memory unit 17a as a paired item matching the encrypted contents.

When a content stored in the memory unit 17a are to be played, the encrypted content key Kc corresponding to the content to be played is retrieved from the memory unit 17a for supply to the security module SM1. In the security module SM1, the decryption unit 19c decrypts the encrypted content key Kc by use of the master key Km, thereby producing the content key Kc. In the meantime, the retrieved content is supplied to the Ks-associated-information demultiplexing unit 13b. The Ks-associated-information demultiplexing unit 13b extracts the encrypted associated information S, and supplies the encrypted associated information S inclusive of the encrypted scramble key Ks to the security module SM1.

The security module SM1 uses the decryption unit 19d to decrypt the encrypted associated information inclusive of the encrypted scramble key Ks by use of the content key Kc that is decrypted by the decryption unit 19c, thereby the scramble key Ks and the play-sequence number being obtained. The play-sequence number is then supplied to the transmission control unit 25. In response, the transmission control unit 25 controls the transmission unit 23 according to the play-sequence number, thereby sending the scramble key Ks to the content-usage-control reception apparatus 5. In the content-usage-control reception apparatus 5, the content descramble unit 15 uses the received scramble key Ks to descramble the encrypted content, thereby outputting the decrypted content.

Maybe a storage device (not shown) is connected to the content-usage-control reception apparatus 5 via a home network or the like. In such a case, a stream (part of the multiplexed encrypted contents) is supplied to the storage device for storage therein via the home network before the stream is supplied to the Ks-associated-information demultiplexing unit 13b.

A content key encrypted again by the master key Km is stored in the storage device together with the encrypted contents and the encrypted associated information. At the time the encrypted contents are to be played, signals retrieved from the storage device (i.e., content signals still in the scrambled state) are supplied to the Ks-associated-information demultiplexing unit 13b of the content-usage-control reception apparatus 5 via the home network, and the encrypted content key is passed from the content-usage-control reception apparatus 5 to the security module SM1. The decryption unit 19c decrypts the encrypted content key, followed by the decryption unit 19d decrypting the scramble key Ks, which is then utilized to descramble the contents.

Stream Input into Content-Usage-Control Reception Apparatus

With reference to FIG. 4, a description will now be given of the relationship between both the scramble key Ks and the content key Kc and the stream (multiplexed encrypted contents: scenes of contents) that is input into the content-usage-control reception apparatus 5. The case under consideration here is a case that contents are watched/listened in real-time. In the following, a description will be given with regard to a case in which a content is divided in a time dimension into scene A, scene B, scene C, scene D, scene E, and so on. If the content is a drama, the scene A may be an opening, the scene B being a CM, the scene C being a main story of the drama, the scene D being a CM, and the scene E being an ending of the drama.

Scramble keys Ks11 through Ks5n used for scrambling these scenes A through E together with play-sequence numbers are included in the scramble-key-associated information. During the scene A, the scramble key is successively changed from the scramble key Ks11 to the scramble key Ks1n at an interval such as one second. The scramble keys Ks11 through Ks1n are given the same play-sequence number 1.

During the scene B, the scramble key is successively changed from the scramble key Ks21 to the scramble key Ks2n at an interval such as one second. The scramble keys Ks21 through Ks2n are given a plurality of play-sequence numbers 2, 3, 4, and 5. During the scene C, the scramble key is successively changed from the scramble key Ks31 to the scramble key Ks3n at an interval such as one second. The scramble keys Ks31 through Ks3n are given the same play-sequence number 6.

Further, during the scene D, the scramble key is successively changed from the scramble key Ks41 to the scramble key Ks4n at an interval such as one second. The scramble keys Ks41 through Ks4n are given play-sequence numbers 7, 8, and 9. During the scene E, the scramble key is successively changed from the scramble key Ks51 to the scramble key Ks5n at an interval such as one second. The scramble keys Ks51 through Ks5n are given the same play-sequence number 10.

The multiplexed encrypted contents include the content-key-associated information C1 (encrypted), which includes the content key Kc and the watching/listening control flag (which is on). The content key Kc is the same with respect to all the scenes A through D. If the watching/listening control flag is on, the scramble key Ks is supplied to the content-usage-control reception apparatus 5 according to the play-sequence number. If the watching/listening control flag is off, the scramble key Ks is supplied to the content-usage-control reception apparatus 5 irrespective of the play-sequence number.

Example 1 of Watching/Listening Control of Contents

With reference to FIG. 3 and FIG. 4, a description will be given of the watching/listening control of a content (scenes A through E) according to play-sequence numbers attached to the content.

The transmission control unit 25 of the security module SM1 compares the play-sequence number of the scramble key Ks being currently decrypted with the play-sequence number of the next scramble key Ks. If these play-sequence numbers are identical, or if the play-sequence number of the next scramble key Ks is equal to the play-sequence number of the currently decrypted scramble key Ks plus one, the transmission control unit 25 controls the transmission unit 23 to send the decrypted scramble key Ks to the content-usage-control reception apparatus 5.

Otherwise, the transmission control unit 25 controls the transmission unit 23 to send an error message (error signal) to the content-usage-control reception apparatus 5, indicating that there are restrictions imposed on the play sequence. When the scramble key Ks is sent from security module SM1 to the content-usage-control reception apparatus 5, the content descramble unit 15 descrambles the encrypted content as in an example A shown in FIG. 4, thereby allowing the watching/listening of the content.

In what follows, a description will be given with regard to a case in which the content is stored in the memory unit 17, and in which a partial scene A1 of the scene A, a partial scene C1 of the scene C, and a partial scene E1 of the scene E are successively played as shown in an example A1 of FIG. 4.

In such a case, the play-sequence number is 1 for the scene A1, so that the transmission control unit 25 sends the scramble key Ks (one of Ks11 through Ks1n) from the transmission unit 23 to the content-usage-control reception apparatus 5. Based on the received scramble key Ks, the content-usage-control reception apparatus 5 descrambles the content (scene A1).

Since the scene C1 corresponds to the play-sequence number 6 that is not the next following play-sequence number, the transmission control unit 25 does not send the scramble key Ks (one of Ks31 through Ks3n) from the transmission unit 23 to the content-usage-control reception apparatus 5. Because of this, the scene B having the next following play-sequence numbers 2, 3, 4, and 5 needs to be descrambled before the scene C1 is descrambled. By the sake token, the scene E1 cannot be descrambled unless the scene D having the play-sequence numbers 7, 8, and 9 is descrambled first.

Namely, a play-sequence number for playing the scene C is unknown when an attempt is made to play the scene C immediately following the scene A in the content-usage-control reception apparatus 5. In order to obtain the play-sequence number, the scene B needs to be played first. This prevents the skipping the scene B that is a CM when watching/listening the contents. That is, the watching/listening of contents by users at the content-usage-control reception apparatus 5 can be controlled on the transmission side.

Example 2 of Watching/Listening Control of Contents

A supplemental explanation will now be provided with regard to the usage of play-sequence numbers included in the scramble-key-associated information. IF the content (scene A through E) is a drama, for example, the scenes A through D may be given the same play-sequence number 1, and the scene E (corresponding to the climax of the drama) may be given play-sequence numbers 2, 3, 4, 5, and 6 that are progressively increased at an interval such as a few seconds. This allows users to freely watch/listen the scenes A through D at the content-usage-control reception apparatus 5, but prevents the scene E to be played out of turn for watching/listening.

Alternatively, the scenes of interviews of actors and actresses appearing in the drama may be included in the scene E, and watching/listening control is implemented to insure that only the users having watched all the scenes A through D can watch the scene E. Namely, the scene E (the end of the content) may be arranged such as to include the most desired scene for the viewers, thereby encouraging the viewers to watch the preceding scenes A through D inclusive of commercials.

Example 3 of Watching/Listening Control of Contents

If the watching/listening control flag contained in the content-key-associated information is off, the content can be played irrespective of the play-sequence numbers as shown in an example B1 shown in FIG. 5. Namely, successive playing of the partial scene A1 of the scene A, the partial scene C1 of the scene C, and the partial scene E1 of the scene E can be performed, rather than having to play the entire sequence of the scenes A through E as shown in the example B.

When the broadcast is directed to a content that is free of charge, the watching/listening control flag included in the content-key-associated information may be set to "on", letting users watch/listen the content at the content-usage-control reception apparatus 5 by use of the content key Kc. In this case, the users cannot skip commercials or the like contained in the content. If a user wishes to skip the commercials or the like during the watching/listening of the content, the user may sign a contract on line or the like to pay a fee to the broadcast provider running the content-usage-control transmission apparatus 3. Upon such contract, the content-usage-control transmission apparatus 3 transmits the content key Kc (content-key-associated information) having the watching/listening control flag set to "off" via the communication channel. Having obtained the content key Kc with the watching/listening control flag thereof turned off, the user can enjoy this content (but not other contents) without any watching/listening restriction.

In this manner, the way a content is watched/listened as intended by the provider (e.g., through usage control that prevents the skipping of commercials) can be forced upon users on the receiver side even when broadcasts are free of charge.

Example 4 of Watching/Listening Control of Contents

The broadcast provider who transmits contents from the transmission side may prepare a plurality of work keys Kw (Kw1, Kw2, and so on) in advance. These work keys are stored as entries of the work-key database in the memory unit 11 of the content-usage-control transmission apparatus 3. The broadcast provider provides the work key Kw1 to a user of the content-usage-control reception apparatus 5 that receives contents for free of charge, and provides the work key Kw2 to a user of the content-usage-control reception apparatus 5 that receives contents by paying prescribed fees to the broadcast provider. These work keys are stored in security modules SM1, which are then distributed to the users.

At the time of transmission of contents (multiplexed encrypted contents) from the content-usage-control transmission apparatus 3, the content-key-associated information encrypted by use of the work key Kw1 with the watching/listening control flag being "on" is also transmitted together with the content-key-associated information encrypted by use of the work key Kw2 with the watching/listening control flag being "off". In this manner, watching/listening control can be conducted in accordance with the type of user contracts.

In the examples of watching/listening control of a content as shown in FIG. 4 and FIG. 5, the play-sequence number is increased one by one. Alternatively, the scenes A through D may be provided with the same play-sequence numbers as shown in FIG. 4 and FIG. 5, but the scene E may be given a play-sequence number 20. In this case, the scene E cannot be watched by use of the content key Kc sent from the transmission side if the content-key-associated information includes the watching/listening control flag that is "on". If the user wishes to watch the scene E, the user may sign a contract on line or the like to pay a fee to the broadcast provider running the content-usage-control transmission apparatus 3. Upon such contract, the content-usage-control transmission apparatus 3 transmits the content key Kc (content-key-associated information) having the watching/listening control flag set to "off" via the communication channel.

Operation 1 of Content-Usage-Control Reception Apparatus

With reference to FIG. 6, a description will be given of the operation that is performed when the contents stored in the memory unit 17 of the content-usage-control reception apparatus 5 are subjected to watching/listening control. The sequence chart of FIG. 6 is directed to a case in which contents are stored as files in the memory unit 17, and are played from the beginning thereof.

The demultiplexing unit 13 of the content-usage-control reception apparatus 5 separates the encrypted content-key-associated information (including the content key Kc) from the multiplexed encrypted contents (SI). The encrypted content-key-associated information is then sent to the security module SM1. Having received the encrypted content-key-associated information, the security module SM1 decrypts the content key Kc and the watching/listening control flag contained in the encrypted content-key-associated information (S2).

A check is made as to whether the decrypted watching/listening control flag is "on" (S3). If a check finds that the decrypted watching/listening control flag is "off", the encrypted associated information separated from the multiplexed encrypted contents is supplied from the content-usage-control reception apparatus 5 to the security module SM1 (S4). Having received the encrypted associated information, the security module SM1 decrypts the encrypted scramble key Ks contained in the encrypted associated information (S5), and supplies the decrypted scramble key Ks to the content-usage-control reception apparatus 5 (S6). Having received the scramble key Ks, the content-usage-control reception apparatus 5 uses the content descramble unit 15 to decrypt the encrypted contents (S7).

If S3 finds that the decrypted watching/listening control flag is "on", the encrypted associated information (inclusive of the scramble key Ks and the play-sequence number) separated from the multiplexed encrypted contents is supplied from the content-usage-control reception apparatus 5 to the security module SM1 (S8). Having received the encrypted associated information, the security module SM1 decrypts the encrypted scramble key Ks and the play-sequence number contained in the encrypted associated information (S9).

The decrypted play-sequence number is compared with a numerical value n (initially set to "1") stored in the memory unit N so as to determine whether the play-sequence number is smaller than the numerical value n stored in the memory unit N (S10). If the comparison indicates that the play-sequence number is smaller than the numerical value n stored in the memory unit N, the scramble key Ks is supplied to the content-usage-control reception apparatus 5 (S11). Having received the scramble key Ks, the content-usage-control reception apparatus 5 uses the content descramble unit 15 to decrypt the encrypted contents (S12).

If S10 finds that the play-sequence number is not smaller than the numerical value n stored in the memory unit N, a check is made as to whether the play-sequence number is equal to the numerical value n plus 1 (S13). If it is not the case, the transmission of the scramble key Ks is terminated, with an error handling process being performed in the content-usage-control reception apparatus 5 (S14). This error handling process is performed in response to the transmission of an error index from the security module SM1 to the content-usage-control reception apparatus 5 where the error index indicates a failure to decrypt the encrypted content.

If S13 finds that the play-sequence number is equal to the numerical value n plus 1, the play-sequence number is stored in the memory unit N (S15). Then, the scramble key Ks is supplied to the content-usage-control reception apparatus 5 (S11). Having received the scramble key Ks, the content-usage-control reception apparatus 5 uses the content descramble unit 15 to decrypt the encrypted contents (S12).

According to the operations described above, contents are decrypted only when the play-sequence number contained in the encrypted associated information are provided in a proper order. This makes it possible to prevent the skipping of commercials incorporated into the contents while allowing free rewinding and replaying of content sections that have already been watched.

Operation 2 of Content-Usage-Control Reception Apparatus

With reference to FIG. 7, a description will be given of the operation that is performed when the contents stored in the memory unit 17 of the content-usage-control reception apparatus 5 are subjected to watching/listening control. The sequence chart of FIG. 7 is directed to a case in which contents are stored as files in the memory unit 17, and are played from the beginning thereof.

The demultiplexing unit 13 of the content-usage-control reception apparatus 5 separates the encrypted content-key-associated information (including the content key Kc) from the multiplexed encrypted contents (S21). The encrypted content-key-associated information is then sent to the security module SM1. Having received the encrypted content-key-associated information, the security module SM1 decrypts the content key Kc and the watching/listening control flag contained in the encrypted content-key-associated information (S22).

A check is made as to whether the decrypted watching/listening control flag is "on" or "off" (S23). If a check finds that the decrypted watching/listening control flag is "off", the encrypted associated information separated from the multiplexed encrypted contents is supplied from the content-usage-control reception apparatus 5 to the security module SM1 (S24). Having received the encrypted associated information, the security module SM1 decrypts the encrypted scramble key Ks contained in the encrypted associated information (S25), and supplies the decrypted scramble key Ks to the content-usage-control reception apparatus 5 (S26). Having received the scramble key Ks, the content-usage-control reception apparatus 5 uses the content descramble unit 15 to decrypt the encrypted contents (S27).

If S23 finds that the decrypted watching/listening control flag is "on", the encrypted associated information separated from the multiplexed encrypted contents is supplied from the content-usage-control reception apparatus 5 to the security module SM1 (S28). Having received the encrypted associated information, the security module SM1 decrypts the encrypted scramble key Ks and the play-sequence number contained in the encrypted associated information (S29).

The decrypted play-sequence number is compared with a numerical value n (initially set to "1") stored in the memory unit N so as to determine whether these values are equal (S30). If the comparison indicates that the play-sequence number is equal to the numerical value n stored in the memory unit N, the scramble key Ks is supplied to the content-usage-control reception apparatus 5 (S31). Having received the scramble key Ks, the content-usage-control reception apparatus 5 uses the content descramble unit 15 to decrypt the encrypted contents (S32).

If S30 finds that the play-sequence number is not equal to the numerical value n stored in the memory unit N, a check is made as to whether the play-sequence number is smaller than the numerical value n or equal to the numerical value n plus 1 (S33). If the play-sequence number is neither smaller than the numerical value n nor equal to the numerical value n plus 1, the transmission of the scramble key Ks is terminated, with an error handling process being performed in the content-usage-control reception apparatus 5 (S34). This error handling process is performed in response to the transmission of an error index from the security module SM1 to the content-usage-control reception apparatus 5 where the error index indicates a failure to decrypt the encrypted content.

If S33 finds that the play-sequence number is smaller than the numerical value n or equal to the numerical value n plus 1, the play-sequence number is stored in the memory unit N (S35). Then, the scramble key Ks is supplied to the content-usage-control reception apparatus 5 (S31). Having received the scramble key Ks, the content-usage-control reception apparatus 5 uses the content descramble unit 15 to decrypt the encrypted contents (S32).

According to the operations described above, contents are decrypted only when the play-sequence number contained in the encrypted associated information are provided in a proper order. This makes it possible to prevent the skipping of commercials incorporated into the contents. Further, the operations described above includes the steps (S33, S34) at which the play-sequence number is stored in the memory unit N even when the play-sequence number is smaller than the numerical value n stored in the memory unit N. This imposes watching/listening restriction according to the play-sequence number even when content sections having already been watched are rewound for replay.

Operation 3 of Content-Usage-Control Reception Apparatus

Figure 8:
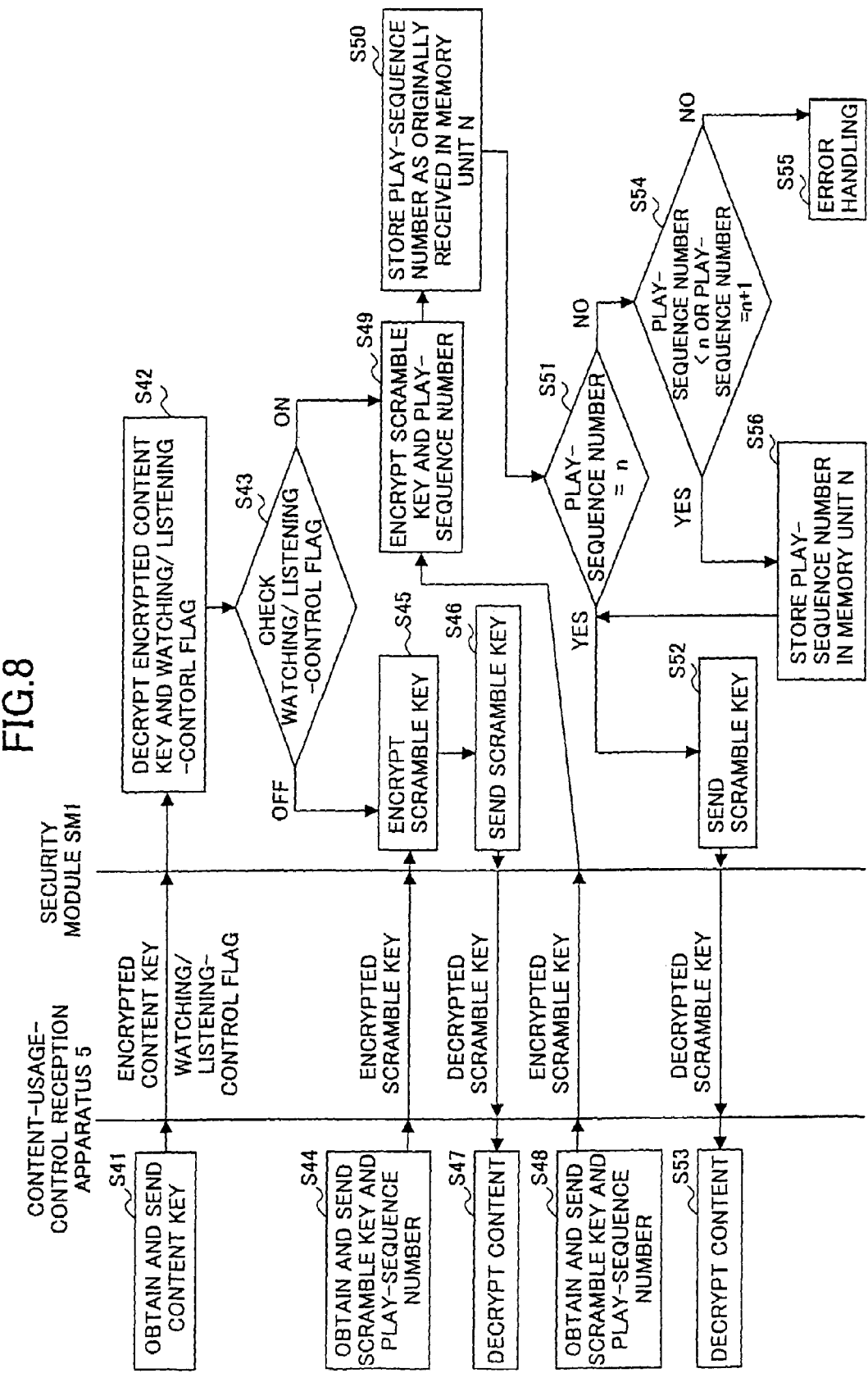
FIG. 8 is a sequence chart showing an operation that is performed when contents being received at the content-usage-control reception apparatus are subjected to watching/listening control in real-time.

With reference to FIG. 8, a description will be given of the operation that is performed when the contents being received at the content-usage-control reception apparatus 5 are subjected to watching/listening control in real-time. This operation takes into account the playing of contents in real-time as they are received and the playing of contents stored in the memory unit 17. Provision is made to allow a content being broadcast to be recorded (stored) from halfway through, and to cope with situations in which part of the content is not recorded or watched when watching the content while recording it.

The demultiplexing unit 13 of the content-usage-control reception apparatus 5 separates the encrypted content-key-associated information (including the content key Kc) from the multiplexed encrypted contents (S41). The encrypted content-key-associated information is then sent to the security module SM1. Having received the encrypted content-key-associated information, the security module SM1 decrypts the content key Kc and the watching/listening control flag contained in the encrypted content-key-associated information (S42).

A check is made as to whether the decrypted watching/listening control flag is "on" or "off" (S43). If a check finds that the decrypted watching/listening control flag is "off", the encrypted associated information separated from the multiplexed encrypted contents is supplied from the content-usage-control reception apparatus 5 to the security module SM1 (S44). Having received the encrypted associated information, the security module SM1 decrypts the encrypted scramble key Ks contained in the encrypted associated information (S45), and supplies the decrypted scramble key Ks to the content-usage-control reception apparatus 5 (S46). Having received the scramble key Ks, the content-usage-control reception apparatus 5 uses the content descramble unit 15 to decrypt the encrypted contents (S47).

If S43 finds that the decrypted watching/listening control flag is "on", the encrypted associated information separated from the multiplexed encrypted contents is supplied from the content-usage-control reception apparatus 5 to the security module SM1 (S48). Having received the encrypted associated information, the security module SM1 decrypts the encrypted scramble key Ks and the play-sequence number contained in the encrypted associated information (S49).

The play-sequence number that is originally received is stored in the memory unit N (S50). The decrypted play-sequence number is then compared with a numerical value n (i.e., the originally received value) stored in the memory unit N so as to determine whether these values are equal (S51). If the comparison indicates that the play-sequence number is equal to the numerical value n stored in the memory unit N, the scramble key Ks is supplied to the content-usage-control reception apparatus 5 (S52). Having received the scramble key Ks, the content-usage-control reception apparatus 5 uses the content descramble unit 15 to decrypt the encrypted contents (S53).

If S51 finds that the play-sequence number is not equal to the numerical value n stored in the memory unit N, a check is made as to whether the play-sequence number is smaller than the numerical value n or equal to the numerical value n plus 1 (S54). If the play-sequence number is neither smaller than the numerical value n nor equal to the numerical value n plus 1, the transmission of the scramble key Ks is terminated, with an error handling process being performed in the content-usage-control reception apparatus 5 (S55). This error handling process is performed in response to the transmission of an error index from the security module SM1 to the content-usage-control reception apparatus 5 where the error index indicates a failure to decrypt the encrypted content.

If S54 finds that the play-sequence number is smaller than the numerical value n or equal to the numerical value n plus 1, the play-sequence number is stored in the memory unit N (S56). Then, the scramble key Ks is supplied to the content-usage-control reception apparatus 5 (S52). Having received the scramble key Ks, the content-usage-control reception apparatus 5 uses the content descramble unit 15 to decrypt the encrypted contents (S53).

According to the operations described above, an initial value set in the memory unit N is equal to the play-sequence number that is originally received with respect to a content to be descrambled. This allows a content to be watched from halfway through as it is being received, or allows a content to be played even if the content is recorded from halfway through, while imposing watching/listening restriction according to the play-sequence number.

Supplemental Explanation of Watching/Listening Control Flag

The above description has been provided with reference to a case in which the watching/listening control flag is one-bit usage-control information. The number of bits of the watching/listening control flag may be increased, thereby designating the flag of "0" to the switching off of watching/listening control, designating the flag of "1" to the control according to the sequence chart of FIG. 7, and designating the flag of "2" to the control according to the sequence chart of FIG. 8.

Such an embodiment provides the following advantages.

The content-usage-control transmission apparatus 3 uses the scramble key Ks to encrypt contents by the content scramble unit 7 (7a). The encryption unit 7b uses the content key Kc stored in the memory unit 11 to encrypt associated information that includes at lest a play-sequence number and the scramble key Ks. The encryption unit 7c uses a work key Kw stored in the memory unit 11 to encrypt content-key-associated information that includes at least a watching/listening flag and the content key Kc. Further, the encryption unit 7d employs a master key to encrypt work-key-associated information that includes at least the work key Kw. The multiplexing unit 9 then generates and transmits multiplexed encrypted contents.

In the content-usage-control reception apparatus 5, the demultiplexing unit 13 receives the multiplexed encrypted contents from the content-usage-control transmission apparatus 3, and separates the received contents into the encrypted contents, the encrypted associated information, the encrypted content-key-associated information, and the encrypted work-key-associated information. The decryption unit 15a decrypts the encrypted work-key-associated information by use of the master key Km to produce a work key Kw. The decryption unit 15b then decrypts the encrypted content key Kc and the encrypted watching/listening control flag by use of the work key Kw to produce the content key Kc and the watching/listening control flag. According to the watching/listening control flag, the decryption unit 15c decrypts the encrypted scramble key Ks and the encrypted play-sequence number. In accordance with the play-sequence number, the decryption unit 15d (the content descramble unit 15) decrypts the encrypted contents by use of the scramble key ks, thereby producing the contents.

In this manner, scramble keys Ks are grouped according to the play-sequence number, which is included in the encrypted associated information (scramble-key-associated information), and are used to encrypt and decrypt contents in the content-usage-control transmission apparatus 3 and the content-usage-control reception apparatus 5, respectively. This makes it possible to prevent illegal use of contents even when the receiver on the reception side is rigged, or is manufactured with a specific design for illegal use. Further, broadcasting stations (broadcast providers) on the transmission side determines the order in which contents are watched on the reception side, thereby achieving content-usage control.

The use of the play-sequence number (play-sequence control information) set by the broadcasting stations on the transmission side makes it possible for the transmission side to impose control as to whether to allow the skipping of some scenes or commercials. Further, broadcast providers relying on advertisement revenues from commercials or the like can keep the advertisement revenues while providing new services to viewers/listeners such as the random-access playing of contents, the search of contents by use of metadata, etc.

Further, the present invention is not limited to these embodiments, but various variations and modifications may be made without departing from the scope of the present invention.

The processing by the content-usage-control transmission apparatus 3 and the content-usage-control reception apparatus 5 may be implemented by way of a content-transmission program and a content-reception program, respectively, written in a program language. Such implementation provides the same advantages as do the content-usage-control transmission apparatus 3 and the content-usage-control reception apparatus 5. Further, such programs may be recorded and distributed in recording media (e.g., flexible disks, CD-ROMs).

The present application is based on Japanese priority application No. 2001-349539 filed on Nov. 15, 2001, with the Japanese Patent Office, the entire contents of which are hereby incorporated by reference.

INDUSTRIAL APPLICABILITY

As is apparent from the description provided above, the industrial applicability of the invention includes, and is not limited to, the use of the invention in the transmission and reception of contents in digital broadcasts.

The invention claimed is:

1. A method of transmitting a content to a reception side, comparing the steps of:

a) encrypting the content by use of a scramble key that varies with time;

b) encrypting scramble-key-associated information that includes at least the scramble key and usage-control information, said usage-control information indicative of usage of the content on the reception side; and c) transmitting the encrypted content and the encrypted scramble-key-associated information to the reception side, wherein the usage-control information includes play-sequence information indicative of an order in which sections of said content are played on the reception side.

2. The method as claimed in claim 1, wherein said step c) includes multiplexing the encrypted content and the encrypted scramble-key-associated information before transmission thereof.

3. The method as claimed in claim 1, wherein said step b) utilizes a shared key of a symmetric cryptography that is shared with the reception side.

4. The method as claimed in claim 1, wherein said step b) encrypts the scramble-key-associated information by use of a content key assigned to the content on a content-specific basis, said method further comprising the steps of:

encrypting, by use of a work key, content-key-associated information that includes at least the content key and watching/listening control information indicative of whether watching/listening control is to be imposed on the reception side; and encrypting, by use of a master key shared with the reception side, work-key-associated information that includes at least the work key, wherein said step c) multiplexes the encrypted content, the encrypted scramble-key-associated information, the encrypted content-key-association information, and the encrypted work-key-associated information, followed by transmission thereof to the reception side.

5. A method of decrypting an encrypted content received from a transmission side, comprising the steps of:

a) receiving the encrypted content and encrypted scramble-key-associated information from the transmission side, said encrypted content being encrypted by use of a scramble key that varies with time;

b) decrypting the encrypted scramble-key-associated information to obtain scramble-key-associated information that includes the scramble key and usage-control information; and c) decrypting the encrypted content by use of the scramble key if said usage-control information permits the decryption of the encrypted content, wherein the usage-control information includes play-sequence information indicative of an order in which sections of said content are played, and said c) does not decrypt a scene of the encrypted content if said play-sequence information indicates that playing of the scene of the encrypted content is out of turn.

6. The method as claimed in claim 5, wherein said step b) utilizes a shared key of a symmetric cryptography that is shared with the transmission side.

7. The method as claimed in claim 5, wherein said step a) further receives encrypted work-key-associated information and encrypted content-key-associated information from the transmission side, and method further comprising the steps of:

decrypting, by use of a master key shared with the transmission side, the encrypted work-key-associated information to obtain work-key-associated information that includes a work key; and decrypting, by use of the work key, the encrypted content-key-associated information to obtain content-key-associated information that includes at least a content key and watching/listening control information, said content key being assigned to the content on a content-specific basis, wherein said step b) encrypts the scramble-key-associated information by use of the content key, and wherein the usage-control information includes play-sequence information indicative of an order in which sections of said content are played, and said c) does not decrypt a scene of the encrypted content if said play-sequence information indicates that playing of the scene of the encrypted content is out of turn and if said watching/listening control information indicates that control of watching/listening is imposed.

8. The method as claimed in claim 7, wherein said c) decrypts the scene of the encrypted content if said watching/listening control information indicates that control of watching/listening is not imposed even in an event that said play-sequence information indicates that playing of the scene of the encrypted content is out of turn.

9. An apparatus for transmitting a content to a reception side comprising:

a content scramble unit which encrypts the content by use of a scramble key that varies with time;

a first encryption unit which encrypts scramble-key-associated information that includes at least the scramble key and usage-control information, said usage-control information indicative of usage of the content on the reception side; and a transmission unit which transmits the encrypted content and the encrypted scramble-key-associated information to the reception side, wherein the usage-control information includes play-sequence information indicative of an order in which sections of said content are played on the reception side.

10. The apparatus as claimed in claim 9, wherein said transmission unit multiplexes the encrypted content and the encrypted scramble-key-associated information before transmission thereof.

11. The apparatus as claimed in claim 9, wherein said first encryption unit utilizes a shared key of a symmetric cryptography that is shared with the reception side.

12. The apparatus as claimed in claim 9, wherein said first encryption unit encrypts the scramble-key-associated information by use of a content key assigned to the content on a content-specific basis, said apparatus further comprising:

a second encryption unit which encrypts, by use of a work key, content-key-associated information that includes at least the content key and watching/listening control information indicative of whether watching/listening control is to be imposed on the reception side; and a third encryption unit which encrypts, by use of a master key shared with the reception side, work-key-associated information that includes at least the work key, wherein said transmission unit multiplexes the encrypted content, the encrypted scramble-key-associated information, the encrypted content-key-associated information, and the encrypted work-key-associated information, followed by transmission thereof to the reception side.

13. An apparatus for decrypting an encrypted content received from a transmission side, comprising:

a receiving unit which receives the encrypted content and encrypted scramble-key-associated information from the transmission side, said encrypted content being encrypted by use of a scramble key that varies with time;

a first decryption unit which decrypts the encrypted scramble-key-associated information to obtain scramble-key-associated information that includes the scramble key and usage-control information; and a content descramble unit which decrypts the encrypted content by use of the scramble key if said usage-control information permits the decryption of the encrypted content, wherein the usage-control information includes play-sequence information indicative of an order in which sections of said content are played, and said content descramble unit does not decrypt a scene of the encrypted content if said play-sequence information indicates that playing of the scene of the encrypted content is out of turn.

14. The apparatus as claimed in claim 13, wherein said first decryption unit utilizes a shared key of a symmetric cryptography that is shared with the transmission side.

15. The apparatus as claimed in claim 13, wherein said receiving unit further receives encrypted work-key-associated information and encrypted content-key-associated information from the transmission side, said method further comprising:

a second decryption unit which decrypts, by use of a master key shared with the transmission side, the encrypted work-key-associated information to obtain work-key-associated information that includes a work key; and a third decryption unit which decrypts, by use of the work key, the encrypted content-key-associated information to obtain content-key-associated information that includes at least a content key and watching/listening control information, said content key being assigned to the content on a content-specific basis, wherein said first decryption unit decrypts the scramble-key-associated information by use of the control key, and wherein the usage-control information includes play-sequence information indicative of an order in which sections of said content are played, and said content descramble unit does not decrypt a scene of the encrypted if said play-sequence information indicates that playing of the scene of the encrypted content is out of turn and if said watching/listening control information indicates that control of watching/listening is imposed.

16. The apparatus as claimed in claim 15, wherein said content descramble unit decrypts the scene of the encrypted content if said watching/listening control information indicates that control of watching/listening is not imposed even in an event that said play-sequence information indicates that playing of the scene of the encrypted content is out of turn.

17. The apparatus as claimed in claim 13, wherein said first decryption unit is implemented as a detachable section of said apparatus.

18. The apparatus as claimed in claim 17, wherein said first decryption unit is an IC card.

19. The apparatus as claimed in claim 18, wherein said first decryption unit utilizes a shared key of a symmetric cryptography that is shared with the transmission side, and that is stored in memory inside said IC card.

20. An apparatus for decrypting an encrypted content received from a transmission side, comprising:

a receiving unit which receives the encrypted content and encrypted scramble-key-associated information from the transmission side, said encrypted content being encrypted by use of a scramble key that varies with time, said encrypted scramble-key-associated information including the scramble key and usage-control information that are encrypted;

a content descramble unit which decrypts the encrypted content by use of the scramble key if said usage-control information permits the decryption of the encrypted content; and an interface unit which is configured to be connected to a decryption unit, which decrypts the encrypted scramble-key-associated information to obtain the scramble key and usage-control information, wherein the usage-control information includes play-sequence information indicative of an order in which sections of said content are played, and said content descramble unit does not decrypt a scene of the encrypted content if said play-sequence information indicates that playing of the scene of the encrypted content is out of turn.

21. The apparatus as claimed in claim 20, wherein said content descramble unit receives the scramble key from the decryption unit via said interface unit if said usage-control information permits the decryption of the encrypted content.

22. The apparatus as claimed in claim 21, wherein said content descramble unit does not receive the scramble key from the decryption unit via said interface unit unless said usage-control information permits the decryption of the encrypted content.

23. An apparatus for decrypting a scramble key, which is configured to be connected to a content receiver for receiving an encrypted content from a transmission side and for decrypting the encrypted content by use of the scramble key, said apparatus comprising:

a decryption unit which receives encrypted scramble-key-associated information from the content receiver, and decrypts the encrypted scramble-key-associated information to obtain scramble-key-associated information that includes the scramble key and usage-control information; and a transmission unit which transmits the scramble key to the content receiver only if said usage-control information permits the decryption of the encrypted content, wherein the scramble key varies with time, and the usage-control information includes play-sequence information indicative of an order in which sections of said content are played, and wherein said transmission unit does not transmits the scramble key to the content receiver if said play-sequence information indicates that playing of a corresponding scene of the encrypted content is out of turn.

24. The apparatus as claimed in claim 23, wherein said decryption unit utilizes a shared key of a symmetric cryptography that is shared with the transmission side.

25. The apparatus as claimed in claim 23, comprising an IC card.

* * * * *